3,413,091
RECOVERY OF AMMONIA PRODUCED IN THE PREPARATION OF AMMONIA SYNTHESIS GAS
Carl E. Alleman, Bartlesville, Okla., assignor to Phillips Petroleum Company, a corporation of Delaware
Filed Feb. 1, 1967, Ser. No. 613,310
2 Claims. (Cl. 23—198)

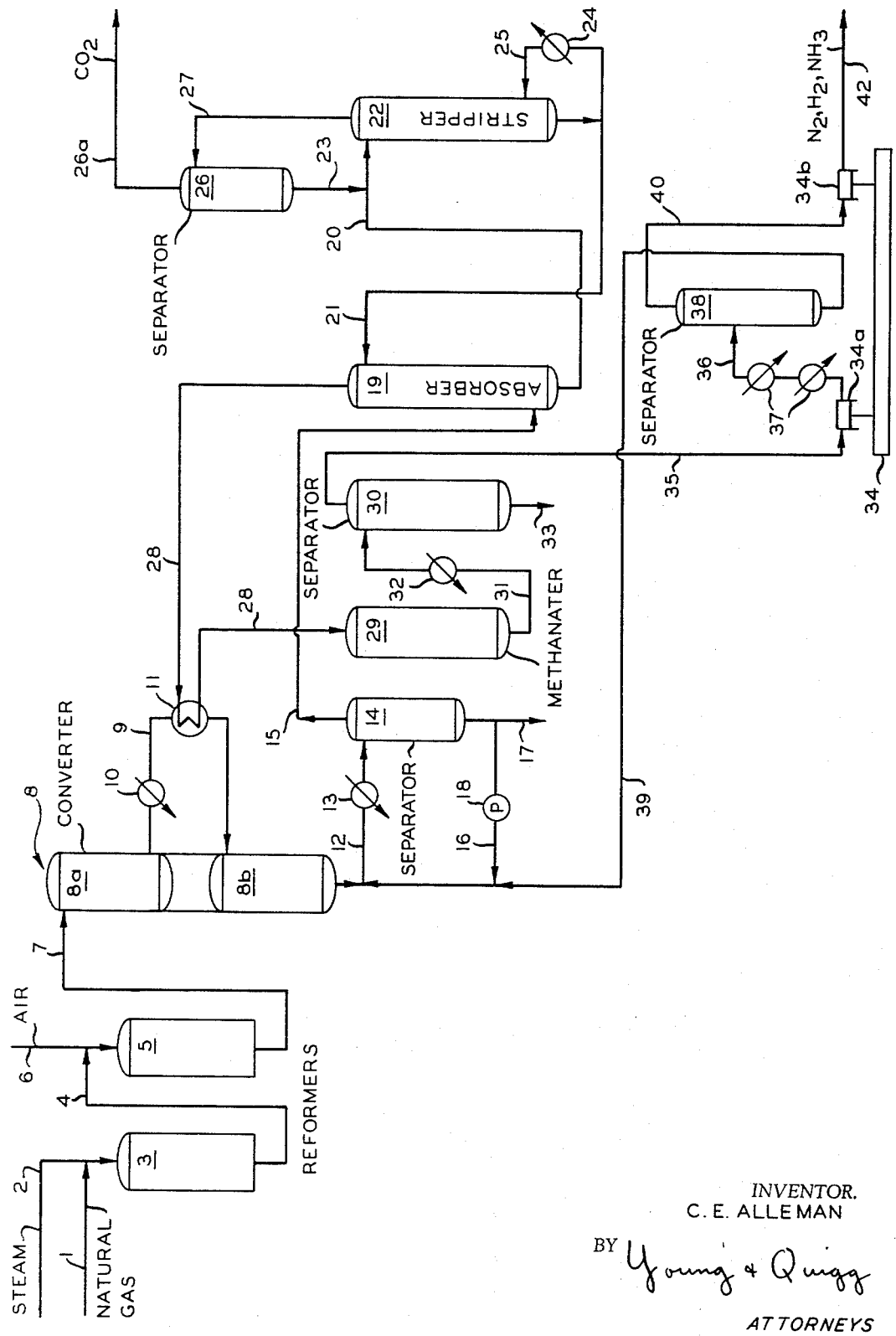

ABSTRACT OF THE DISCLOSURE

In the production of ammonia synthesis gas wherein a methane stream is reformed, nitrogen is then added to the stream and it is passed to a carbon monoxide catalytic converter (shift converter), the oxidized products are then removed therefrom and the stream is passed to a compressor wherein an aqueous phase is removed to thereby yield a stream of ammonia synthesis gas that is subsequently passed to an ammonia synthesis zone, it has been found that a substantial amount of ammonia is prematurely synthesized in the shift converter and is passed out of the process in the aqueous phase removed from the compressor. This invention recovers this ammonia produced in the shift converter by recycling the aqueous stream from the compressor to the stream from the shift converter, the ammonia within the aqueous stream thereby vaporizing and ultimately passing from the compressor in the ammonia synthesis gas.

---

This invention relates to the production of ammonia synthesis gas. In another aspect, this invention relates to a method and apparatus for recovering ammonia produced in shift converters during the preparation of ammonia synthesis gas.

In the process of manufacturing ammonia, the first step is usually that of producing synthesis gas containing three parts of hydrogen for each part of nitrogen. This may be accomplished by reacting a hydrocarbon such as methane, as may be found in natural gas, with super-heated steam in the presence of a suitable catalyst. This reaction generally takes place in what is known as the primary reformer. The effluent from this reaction comprising nitrogen, carbon monoxide, carbon dioxide, and methane, is passed to what is known as a secondary reformer to which is also added a sufficient quantity of air which, after the oxygen is removed in the form of oxygen-containing compounds, provides the correct proportion of nitrogen. Also, in the secondary reformer a portion of the hydrogen, carbon monoxide and methane are oxidized by the oxygen in the air. This material is then passed to a shift converter for conversion of most of the carbon monoxide with steam to carbon dioxide and hydrogen. Suitable means are then used for removing the steam by quenching and cooling the carbon dioxide by amine treatment and the residual carbon monoxide by methane formation before the synthesis gas comprising primarily nitrogen and hydrogen is passed to the synthesis zone.

It has been found that substantial amounts of ammonia have been produced in the shift converter. This ammonia will normally be contained in a liquid phase removed from the compression zone after the synthesis gas is compressed and cooled in preparation for the ammonia synthesis. The liquid phase from the compression zone is usually discarded as waste and may end up in rivers or streams or the like. This results not only in substantial losses of ammonia, but also a needless river and stream pollution.

Therefore, one object of this invention is to provide an improved method and apparatus for producing ammonia synthesis gas that will prevent river and stream pollution.

Another object of this invention is to provide an improved method and apparatus for recovering ammonia that is prematurely synthesized in the shift converter in the preparation of ammonia synthesis gas.

According to the invention, the liquid phase formed in the compressing and cooling zones during the compression and cooling of the treated ammonia synthesis gas is recycled to the effluent stream from the shift converter. In the plant start-up, most of the ammonia produced in the shift converter will be contained in the liquid formed in the compressing and cooling operation. For example, the treated synthesis gas stream to a first compressor in the compression zone is at about 100–500 p.s.i.g., and is compressed to about 825–2000 p.s.i.g. in this said first compressor. The compressed fluid stream is then cooled to about 33–90° F. Under these conditions, most of the ammonia initially produced in the shift converter will be contained in the liquid phase formed in this compression and cooling operation. As the process continues, and a steady state of operation is attained, ammonia in the liquid phase from the first stage of the compression zone will reach a maximum and substantially constant concentration therein under the stated conditions of temperature and pressure and the increased resulting ammonia in the vaporous phase will pass to the second stage of the compressor, through the ammonia synthesis zone and will finally be recovered with the ammonia product. By utilizing this invention, a major portion of the ammonia produced in the shift converter can be recovered as product from the process.

This invention can be more easily understood from a study of the drawing which is a schematic flow diagram illustrating the process of this invention. Now referring to the drawing, natural gas and steam are passed through conduits 1 and 2 respectively, to primary reformer 3 wherein they contact a suitable reforming catalyst such as supported reduced nickel oxide at a temperature preferably in the range of 1370 to 1525° F. Heat is added indirectly to the reaction in reformer 3 by burning fuel in reformer 3. The effluent from primary reformer 3 which comprises hydrogen, carbon dioxide, carbon monoxide, water and methane, is passed to secondary reformer 5 via conduit 4. An air stream is also introduced into secondary reformer 5 via conduit 6 which provides the necessary nitrogen for the synthesis gas. Secondary reformer 5 contains another bed of reforming catalysts which may be either the same or different from the catalyst used in primary reformer 3. A suitable reaction temperature for the secondary reforming step is in the range of 1600 to 1830° F. In secondary reformer 5, the oxygen from the air oxidizes some of the hydrogen, carbon monoxide and methane so that the oxygen can be easily removed in the form of water and carbon dioxide.

The reformed stream from secondary reformer 5 is next passed to stage 8a of shift converter 8 which converts carbon monoxide to a carbon dioxide. The effluent from stage 8a is passed to stage 8b via conduit 9 wherein it is cooled by heat exchanges 10 and 11. In shift converter 8a, the gaseous stream is contacted with a catalyst which is substantially iron-chromium, and in shift converter 8b the gaseous stream is contacted with a catalyst which is substantially iron-copper, wherein about ⅘ or more of the carbon monoxide is converted to carbon dioxide. As stated, it has been found that a substantial portion of ammonia is prematurely synthesized in shift converter 8 as the nitrogen and hydrogen gases contact the catalyst. Heretofore most of this ammonia has not been recovered.

The effluent from shift converter 8 passes to liquid vapor separator 14 via conduit 12. Heat exchanger 13 cools the effluent to about 100–250° F., preferably to about 150° F., and the pressure within liquid vapor separator 14 is from about 0–400 p.s.i.g., preferably at about 390 p.s.i.g. A portion of the effluent from liquid vapor separator 14 is recycled to conduit 12 via conduit 16 and pump 18. Another portion of this effluent is withdrawn via conduit 17 as waste. Due to the above stated temperature and pressure within liquid vapor separator 14, the amount of ammonia that will be contained within the liquid stream withdrawn via conduit 17 will be very small. The liquid from liquid vapor separator 38 is also directed into conduit 16 via conduit 39.

The vapor from separator 14 is next passed to the lower portion of $CO_2$ absorber 19 via conduit 15. An amine stream such as monoethanolamine is fed into the upper region of $CO_2$ absorber 19 via conduit 21. The amine stream containing the absorbed $CO_2$ is then passed to $CO_2$ stripper 22 via conduit 20. A first portion of the amine stream from $CO_2$ stripper 22 is recycled to stripper 22 via conduit 25 and heat exchanger 24. A second portion of the amine stream from stripper 22 passes to $CO_2$ absorber 19 via conduit 21. The vapor from stripper 22 passes to separator 26 via conduit 27 and $CO_2$ is withdrawn from separator 26 via conduit 26a.

The vaporous stream from $CO_2$ absorber 19 is passed through heat exchanger 11 and to methanater 29 via conduit 28. In methanater 29 the effluent gases from $CO_2$ absorber 19 are passed over catalyst beds comprised substantially of nickel or the like wherein any remaining carbon monoxide is reacted with hydrogen in the stream to form methane.

The effluent gas from methanater 29 is passed to separator 30 via conduit 31 and heat exchanger 32. Water is removed from separator 30 via conduit 33 and the resulting vapor is passed to first stage compresser 34a of compressor 34 via conduit 35. Compressor 34a increases the pressure of the gas stream from 100–500 p.s.i.g. to 825–2000 p.s.i.g., preferably from about 360 p.s.i.g. to 930 p.s.i.g.

The fluid from compressor 34a passes through conduit 36 wherein it is cooled by coolers 37, and on to liquid vapor separator 38. The gaseous stream removed from the upper region of liquid vapor separator 38 is then passed to compressor 38b wherein it is further compressed. The compressed gases from compressor 38b are then passed to a conventional ammonia synthesis zone via conduit 42. Thus, the fluid entering liquid vapor separator 38 is maintained at about 920 p.s.i.g. and 46° F. Under these conditions the amount of ammonia required to saturate the liquid will be relatively high. Heretofore, the liquid phase from liquid vapor separator 38 was discarded as waste material. However, as shown by the drawing, the liquid phase from liquid vapor separator 38 is recycled back to conduit 16 and the ammonia therein is flashed as the liquid from conduit 39 admixes with the liquid in conduit 16 which is maintained at about 152° F. Thus, as a steady state of operation is attained within, a substantial amount of the ammonia formed in the shifter 8, which was heretofore lost, is now recovered with the product ammonia.

A typical set of data for this invention is shown in Tables I–III below. All of the values in Tables I–III are in moles per hour unless stated otherwise. Table I shows the temperature, pressure and mass flow rate of the streams entering primary reformer 3. Table II illustrates a material balance around shift converter 8 and the analysis of the stream flowing out waste conduit 17. Table III illustrates material balance around compressor 34.

TABLE I

| Stream in conduit: | 1 | 2 |
|---|---|---|
| | mols/hr. | |
| $N_2$ | 103.3 | |
| $CO_2$ | 5.4 | |
| $CH_4$ | 1,164.7 | |
| $C_2H_6$ | 91.7 | |
| $C_3H_8$ | 33.9 | |
| $C_4H_{10}$ | 9.6 | |
| $C_5H_{12}$ | 2.2 | |
| $C_6H_{14}$ | 0.7 | |
| $H_2O$ | | 5,259.8 |
| Total | 1,411.5 | 5,259.8 |
| Temp. ° F | 0–80 | 600 |
| Pressure (p.s.i.g.) | 560 | 525 |

An analysis of Tables II and III will show that about 4.1 moles per hour of ammonia are produced in the shift

TABLE II

| Stream: | 7 | 12 | 17 |
|---|---|---|---|
| | mols/hr. | | |
| $NH_3$ | | 4.1 | 2.2 |
| $O_2$ | | | |
| $N_2$ | 1,586.1 | 1,586.1 | |
| Ar | 19.0 | 19.0 | |
| $H_2$ | 3,998.5 | 4,879.1 | |
| CO | 920.6 | 40.0 | |
| $CO_2$ | 524.4 | 1,445.0 | |
| $CH_4$ | 24.1 | 24.1 | |
| $H_2O$ | 4,239.2 | 3,358.6 | 3,281.6 |
| Total | 11,351.9 | 11,356.0 | 3,283.8 |
| Temp ° F | 700 | 256 | 156 |
| Pressure (p.s.i.g.) | 400 | 390 | |

TABLE III

| Stream: | 35 | 39 | 42 |
|---|---|---|---|
| | mols/hr. | | |
| $NH_3$ | 2.0 | 0.8 | 1.9 |
| $O_2$ | | | |
| $N_2$ | 1,586.1 | | 1,586.1 |
| Ar | 19.0 | | 19.0 |
| $H_2$ | 4,756.2 | | 4,756.2 |
| CO | 40.0 | | 40.0 |
| $CO_2$ | | | 0.7 |
| $CH_4$ | 64.8 | | 64.8 |
| $H_2O$ | 15.7 | 15.5 | 0.2 |
| Total | 6,443.8 | 16.3 | 6,428.2 |
| Temp ° F | 100 | 46. | 155 |
| Pressure (p.s.i.g.) | 366 | 930 | 2,130 | converter of which about 2.1 moles per hour pass through conduit 17 as waste. 1.9 moles per hour ultimately will be recovered from the ammonia synthesis zone. It is also interesting to note that without the use of this invention about 0.9 mole per hour went to the ammonia synthesis zone. Thus, by recycling the liquid collected in liquid vapor separator 38 to conduit 16, instead of discarding the liquid as waste, not only is needless river pollution prevented, but also an increase of ammonia production by about 1.0 mole per hour results. It must also be noted, that the ammonia content in the stream flowing through conduit 17 is not substantially increased by the recycle of the liquid stream by conduit 39. Thus, essentially all of the ammonia in the liquid stream that is recycled to conduit 16 is ultimately recovered from the ammonia synthesis zone.

I claim:

1. In a process for manufacturing ammonia wherein a synthesis gas stream containing nitrogen and hydrogen is fed into an ammonia synthesis zone, said process comprising reforming a methane-containing gas stream with steam to form a hydrogen-containing reformed stream, introducing oxygen to the reformed stream to thereby oxidize the portion of the constituents in said reformed stream, introducing nitrogen into said reformed stream, passing the resulting stream through a carbon monoxide catalytic conversion zone to further oxidize a portion of said reformed stream, ammonia also being synthesized therein, removing the oxidized portion from said resulting steram, passing said resulting stream through a compression and cooling zone wherein a liquid phase containing ammonia is separated therefrom to yield a synthesis gas comprising hydrogen and nitrogen, introducing said synthesis gas stream into an ammonia synthesis zone, and removing the resulting ammonia from said ammonia synthesis zone, the improvement comprising passing said liquid phase from said compressing and cooling zone at a temperature from about 33 to 90° F. and a pressure from about 825 to 2000 p.s.i.g. to said resulting stream from said carbon monoxide catalytic conversion zone separating condensate therefrom at a temperature from about 100 to 250° F. and a pressure from about 0 to 400 p.s.i.g., ammonia within said liquid phase flashing therefrom and ultimately being carried to said ammonia synthesis zone by said ammonia synthesis gas stream.

2. The process of claim 1 wherein the said resulting stream from said carbon monoxide conversion zone is maintained at about 390 p.s.i.g. and at about 150° F. and said liquid from said compression zone is maintained at about 930 p.s.i.g. and about 46° F.

References Cited
UNITED STATES PATENTS

| | | | |
|---|---|---|---|
| 2,610,106 | 9/1952 | Gray | 23—199 |
| 3,027,237 | 3/1962 | McMullan | 23—199 |

OSCAR R. VERTIZ, *Primary Examiner.*

H. S. MILLER, *Assistant Examiner.*